(12) United States Patent
Kamio et al.

(10) Patent No.: US 11,694,482 B2
(45) Date of Patent: Jul. 4, 2023

(54) INFORMATION PROCESSING DEVICE AND ATTENDANCE STATE MANAGEMENT METHOD

(71) Applicant: PANASONIC i-PRO SENSING SOLUTIONS CO., LTD., Fukuoka (JP)

(72) Inventors: Takashi Kamio, Kanagawa (JP); Ryo Kitamura, Fukuoka (JP); Michito Hirose, Fukuoka (JP); Yohei Yamaguchi, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 385 days.

(21) Appl. No.: 16/932,247

(22) Filed: Jul. 17, 2020

(65) Prior Publication Data

US 2021/0027548 A1 Jan. 28, 2021

(30) Foreign Application Priority Data

Jul. 22, 2019 (JP) .................................. 2019-134542

(51) Int. Cl.
*G06K 9/00* (2022.01)
*G07C 1/10* (2006.01)
(Continued)

(52) U.S. Cl.
CPC .............. *G07C 1/10* (2013.01); *G06T 7/0014* (2013.01); *G06V 40/172* (2022.01); *H04L 65/60* (2013.01); *G06T 2207/30201* (2013.01)

(58) Field of Classification Search
CPC ........ G07C 1/10; G07C 9/253; G06T 7/0014; G06T 2207/30201; G06V 40/172; H04L 65/60; H04L 65/4015; H04L 65/1073
See application file for complete search history.

(56) References Cited

U.S. PATENT DOCUMENTS

| | | | |
|---|---|---|---|
| 2002/0030582 A1* | 3/2002 | Depp | G07C 1/10 340/5.83 |
| 2014/0192134 A1* | 7/2014 | Jung | H04N 21/4788 348/14.02 |

(Continued)

FOREIGN PATENT DOCUMENTS

| | | |
|---|---|---|
| JP | 2004-220130 | 8/2004 |
| JP | 2007-102344 | 4/2007 |

(Continued)

OTHER PUBLICATIONS

Castillo et al. "Class Attendance Generation through Multiple Facial Detection and Recognition Using Artificial Neural Network" (Year: 2018).*

(Continued)

*Primary Examiner* — Dhaval V Patel
(74) *Attorney, Agent, or Firm* — Greenblum & Bernstein, P.L.C.

(57) ABSTRACT

An information processing device includes a receiving unit for receiving face image data of a student, who takes a class in a classroom, a plurality of times during the class from a camera provided in the classroom; a control unit for comparing the face image data with registered face image data of the student and count the number of times the student of the registered face image data is photographed by the camera during the class; and a transmission unit for transmitting the number of times of photographing to a terminal device used by a teacher who teaches the class.

11 Claims, 8 Drawing Sheets

(51) Int. Cl.
*H04L 65/60* (2022.01)
*G06T 7/00* (2017.01)
*G06V 40/16* (2022.01)

(56) References Cited

U.S. PATENT DOCUMENTS

| | | | |
|---|---|---|---|
| 2018/0225307 A1* | 8/2018 | Kocher | G06F 16/54 |
| 2019/0130174 A1* | 5/2019 | Chen | G06K 9/00 |

FOREIGN PATENT DOCUMENTS

| | | |
|---|---|---|
| JP | 2008-250830 | 10/2008 |
| JP | 2012-043389 | 3/2012 |
| JP | 2015-095017 | 5/2015 |
| JP | 2017-107492 | 6/2017 |
| JP | 2017-157147 | 9/2017 |

OTHER PUBLICATIONS

Japan Office Action issued in Japan Patent Application No. 2019-134542, dated Jul. 26, 2022, together with English translation thereof.

* cited by examiner

| STUDENT INFORMATION | CLASS INFORMATION |
|---|---|
| <br>NAME AA AA | MON : 9:00-10:30  EAST A CLASSROOM<br>MON : 10:00-12:10  EAST A CLASSROOM<br>MON : 13:00-14:30  EAST B CLASSROOM<br>... |
| <br>NAME BB BB | MON : 9:00-10:30  EAST A CLASSROOM<br>MON : 10:40-12:10  EAST A CLASSROOM<br>MON : 13:00-14:30  EAST B CLASSROOM<br>... |
| <br>NAME CC CC | MON : 9:00-10:30  EAST A CLASSROOM<br>MON : 10:40-12:10  EAST A CLASSROOM<br>MON : 13:00-14:30  EAST B CLASSROOM<br>... |

INFORMATION PROCESSING DEVICE AND ATTENDANCE STATE MANAGEMENT METHOD

CROSS-REFERENCE TO RELATED APPLICATIONS

This application is based on and claims priority under 35 USC 119 from Japanese Patent Application No. 2019-134542 filed on Jul. 22, 2019, the contents of which are incorporated herein by reference.

TECHNICAL FIELD

The present disclosure relates to an information processing device, an attendance state management method, and a non-transitory computer readable storage medium on which a program for making a computer to execute the attendance state management method is stored.

BACKGROUND ART

In related art, there has been proposed an attendance management method that realizes attendance management of students in an educational institution while reliably preventing fraudulent actions with minimum equipment investment and without extra operation burden on teachers and students (see, for example, Patent Literature 1).

CITATION LIST

Patent Literature

Patent Literature 1: JP-A-2015-95017

SUMMARY OF INVENTION

In university classes or the like, attendance of students may be managed by writing an attendance card. In this case, for example, a student may write the attendance card and escape in the middle of a class. For this reason, there is a demand for a technique that enables a teacher to grasp an attendance state of the student during the class.

Non-limiting examples of the present disclosure contribute to provision of an information processing device, an attendance state management method, and a non-transitory computer readable storage medium on which a program for making a computer to execute the attendance state management method is stored that enable the teacher to grasp the attendance state of the student in the class.

An information processing device according to an aspect of the present disclosure includes a receiving unit configured to receive face image data of a student, who takes a class in a classroom, a plurality of times during the class from a camera provided in the classroom; a control unit configured to compare the face image data with registered face image data of the student and count the number of times the student of the registered face image data is photographed by the camera during the class; and a transmission unit configured to transmit the number of times of photographing to a terminal device used by a teacher who teaches the class.

An attendance state management method according to an aspect of the present disclosure includes receiving face image data of a student, who takes a class in a classroom, a plurality of times during the class from a camera provided in the classroom; comparing the face image data with registered face image data of the student and counting the number of times the student of the registered face image data is photographed by the camera during the class; and transmitting the number of times of photographing to a terminal device used by a teacher who teaches the class.

An non-transitory computer readable storage medium on which a program for making a computer to execute an attendance state management method is stored according to an aspect of the present disclosure is provided. The attendance state management method includes: receiving face image data of a student, who takes a class in a classroom, a plurality of times during the class from a camera provided in the classroom; comparing the face image data with registered face image data of the student and counting the number of times the student of the registered face image data is photographed by the camera during the class; and transmitting the number of times of photographing to a terminal device used by a teacher who teaches the class.

It should be noted that these comprehensive or specific aspects may be realized by a system, a device, a method, an integrated circuit, a computer program, or a recording medium, or may be realized by any combination of the system, the device, the method, the integrated circuit, the computer program, and the recording medium.

According to an example of the present disclosure, the teacher can grasp the attendance state of the student in the class.

Also, advantages and effects of one example of the present disclosure will become apparent from the specification and drawings. These advantages and/or effects are provided by features described in several embodiments and the specification and drawings, and it is not necessary to provide all the features in the embodiments and the specification and drawings to obtain one or more identical features.

BRIEF DESCRIPTION OF DRAWINGS

FIG. 10 shows an example of the screen displayed on the display device of the terminal device.

DESCRIPTION OF EMBODIMENTS

Hereinafter, an embodiment of the present invention will be described in detail with reference to the drawings as appropriate. However, unnecessarily detailed descriptions may be omitted. For example, a detailed description of a well-known matter or a repeated description of substantially the same configuration may be omitted. This is to avoid unnecessary redundancy in the following description and to facilitate understanding of those skilled in the art.

It should be noted that the accompanying drawings and the following description are provided for a thorough understanding of the present disclosure by those skilled in the art, and are not intended to limit the subject matter recited in the claims.

Figure 1:
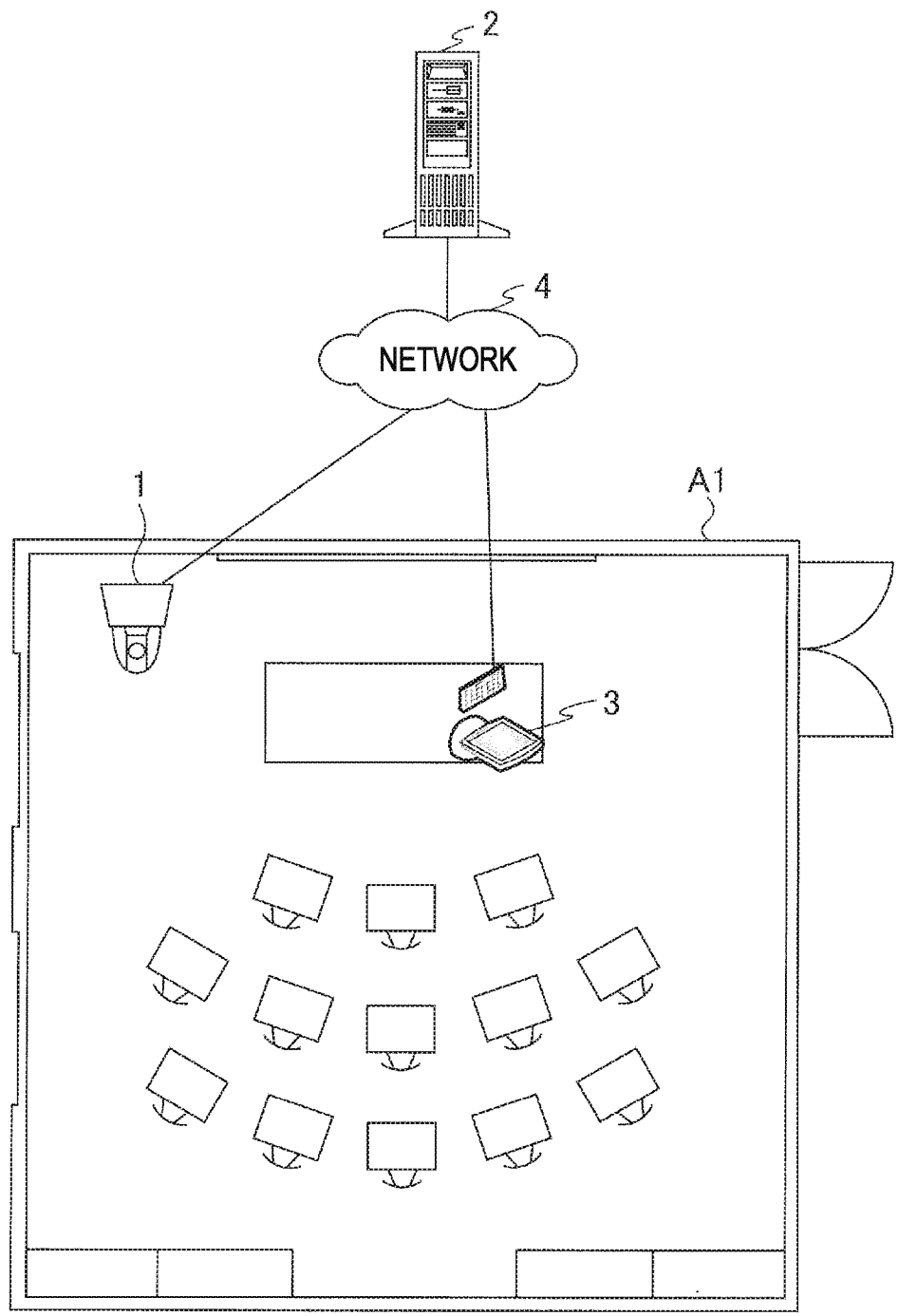
FIG. 1 shows an example of an attendance state management system according to an embodiment.

FIG. 1 shows an example of an attendance state management system according to an embodiment. As shown in FIG. 1, the attendance state management system includes a camera 1, an information processing device 2, and a terminal device 3. The camera 1, the information processing device 2, and the terminal device 3 are connected via a network 4, such as a local area network (LAN) or the Internet, for example. FIG. 1 shows a plan view of a classroom A1 in addition to the attendance state management system.

The camera 1 is located at a position where a face of a student who takes a class in the classroom A1 can be photographed. For example, the camera 1 is arranged on a ceiling on a front side of the classroom A1. The front side of the classroom A1 is, for example, a side where a teacher stands and teaches the class, or a side where a blackboard is provided. The camera 1 may be, for example, a pan tilt zoom (PTZ) camera. The camera 1 photographs the face of the student who takes the class in the classroom A1, and transmits photographed face image data of the student to the information processing device 2.

The information processing device 2 is, for example, a server. The information processing device 2 may also be configured by a plurality of servers. The information processing device 2 may be provided in the same building as a building of the classroom A1 or may be provided in another building.

Registered face image data of the student who takes the class in the classroom A1 is stored in advance in the information processing device 2. The information processing device 2 compares the registered face image data stored in advance with the face image data of the student photographed by the camera 1, and manages an attendance state of the student who takes the class in the classroom A1. The attendance state includes, for example, a time when the student of the registered face image data is photographed by the camera 1 and the number of times of photographing of the camera 1 during one class.

The terminal device 3 is, for example, a personal computer, a tablet terminal, or a smartphone. The terminal device 3 is used by, for example, a teacher who teaches the class in the classroom A1.

The terminal device 3 receives information of the attendance state of the student who takes the class in the classroom A1 from the information processing device 2. The terminal device 3 displays the information received from the information processing device 2 on a display device. For example, the terminal device 3 displays the time when the student of the registered face image data is photographed by the camera 1 and the number of times of photographing on the display device (see, for example, FIG. 8). As a result, the teacher can determine whether the student has taken the class in real time.

Further, the number of cameras provided in the classroom A1 may be two or more. A surveillance camera already provided in the classroom A1 may also be used as the camera 1. For example, the surveillance camera already provided in the classroom A1 may be used as a part of a recording system that records video in the classroom A1 as the camera 1. In this case, output of the surveillance camera may be branched to the recording system and the information processing device 2.

Further, there may be a plurality of classrooms. In each of the plurality of classrooms, one or more cameras that photograph the face of the student who takes the class are provided. The cameras provided in the plurality of classrooms are connected to the information processing device 2. A terminal device used by the teacher who teaches the class is arranged in each of the plurality of classrooms.

Hereinafter, the face image data may be referred to as face data. The registered face image data may be referred to as registered face data.

Figure 2:
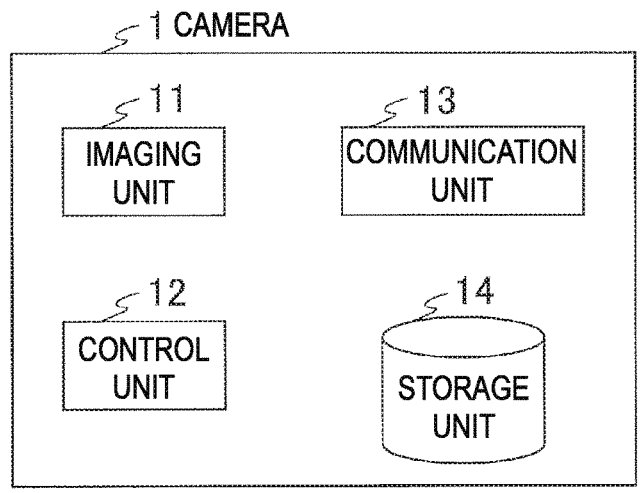
FIG. 2 shows a block configuration example of a camera.

FIG. 2 shows a block configuration example of the camera 1. As shown in FIG. 2, the camera 1 includes an imaging unit 11, a control unit 12, a communication unit 13, and a storage unit 14.

The imaging unit 11 includes, for example, a lens and an imaging element (not shown). The lens of the imaging unit 11 forms an image of a subject on a light receiving surface of the imaging element. The imaging unit 11 converts an electric signal (analog signal) into a digital signal according to light received on the light receiving surface of the imaging element, and outputs the digital signal to the control unit 12. The imaging unit 11 is movable in pan and tilt directions and changes a focal length according to control of the control unit 12.

The control unit 12 controls the entire camera 1. The control unit 12 may be configured by, for example, a central processing unit (CPU) or a digital signal processor (DSP). The control unit 12 detects a human face included in an image output from the imaging unit 11. The control unit 12 cuts out the detected human face, and transmits face data (still image) of the cut-out face to the information processing device 2 via the communication unit 13.

The communication unit 13 communicates with the information processing device 2. The communication unit 13 may communicate with the information processing device 2 via a network cable (wired), such as an Ethernet (registered trademark) cable. The communication unit 13 may also communicate with the information processing device 2 via short-range wireless communication, such as Wi-Fi (registered trademark) or Bluetooth (registered trademark).

A program configured to operate the control unit 12 is stored in the storage unit 14. Data for the control unit 12 to perform calculation processing, or data for the control unit 12 to control each unit is stored in the storage unit 14. The storage unit 14 may be configured by a storage device such as a random access memory (RAM), a read only memory (ROM), a flash memory, or a hard disk drive (HDD).

Figure 3:
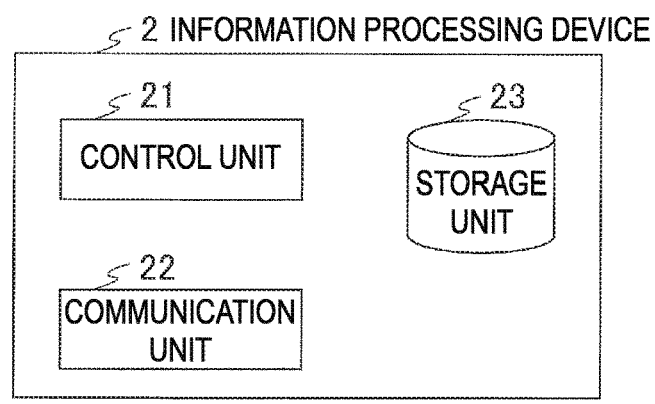
FIG. 3 shows a block configuration example of an information processing device.

FIG. 3 shows a block configuration example of the information processing device 2. As shown in FIG. 3, the information processing device 2 includes a control unit 21, a communication unit 22, and a storage unit 23.

The control unit 21 controls the entire information processing device 2. The control unit 21 may be configured by, for example, a CPU.

The communication unit 22 communicates with the camera 1 and the terminal device 3. The communication unit 22 may communicate with the camera 1 and the terminal device 3 via a network cable such as an Ethernet cable. The communication unit 22 may also communicate with the camera 1 and the terminal device 3 via short-range wireless communication, such as Wi-Fi or Bluetooth.

A program configured to operate the control unit 21 is stored in the storage unit 23. Data for the control unit 21 to perform calculation processing, or data for the control unit 21 to control each unit is stored in the storage unit 23. The storage unit 23 may be configured by a storage device such as a RAM, a ROM, a flash memory, or an HDD.

Figure 4:
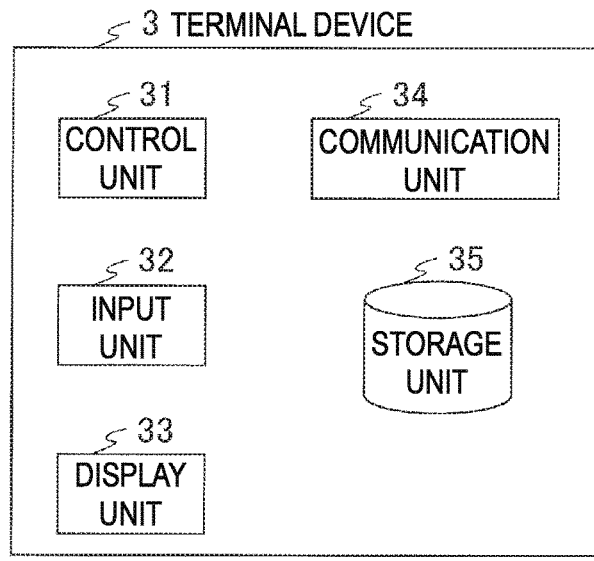
FIG. 4 shows a block configuration example of a terminal device.

FIG. 4 shows a block configuration example of the terminal device 3. As shown in FIG. 4, the terminal device 3 includes a control unit 31, an input unit 32, a display unit 33, a communication unit 34, and a storage unit 35.

The control unit 31 controls the entire terminal device 3. The control unit 31 may be configured by, for example, a CPU.

The input unit 32 is connected to an input device (not shown), such as a keyboard, a touch panel superimposed on a screen of a display device, or a mouse. The input unit 32 receives a signal according to an operation of a user, which is output from the input device, and outputs the signal to the control unit 31.

The display unit 33 is connected to a display device (not shown) included in the terminal device 3. The display unit 33 outputs image data output from the control unit 31 to the display device.

The communication unit 34 communicates with the information processing device 2. The communication unit 34 may communicate with the information processing device 2 via a network cable, such as an Ethernet cable. The communication unit 34 may also communicate with the information processing device 2 via short-range wireless communication such as Wi-Fi or Bluetooth.

A program configured to operate the control unit 31 is stored in the storage unit 35. Data for the control unit 31 to perform calculation processing, or data for the control unit 31 to control each unit is stored in the storage unit 35. The storage unit 35 may be configured by a storage device such as a RAM, a ROM, a flash memory, or an HDD.

Figure 5:
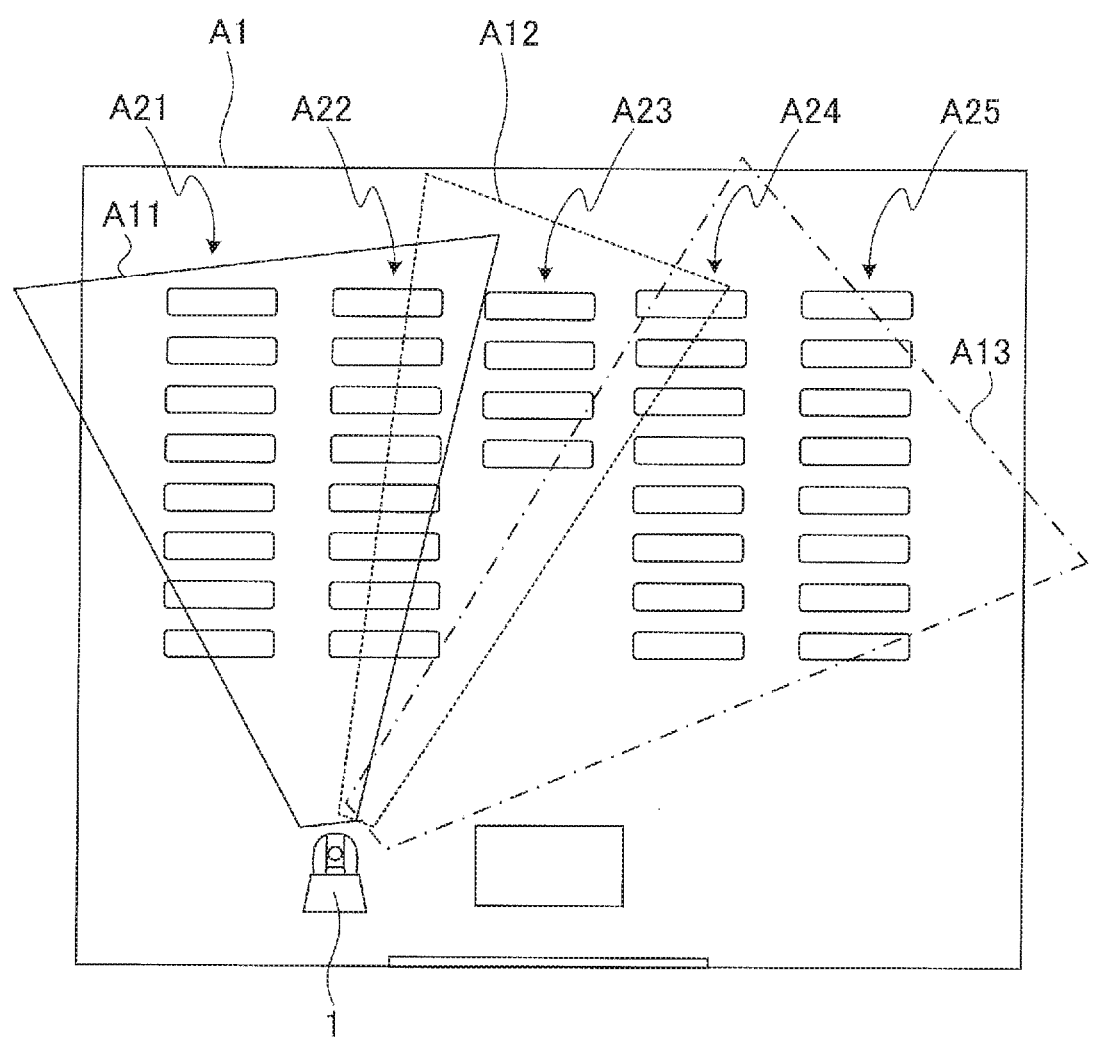
FIG. 5 shows an example of a photographing area of the camera.

FIG. 5 shows an example of a photographing area of the camera 1. FIG. 5 shows the classroom A1 and the camera 1 shown in FIG. 1. Arrangement of desks and arrangement of the camera 1 in the classroom A1 shown in FIG. 5 are different from that of the example of FIG. 1.

The camera 1 divides the inside of the classroom A1 into three areas A11 to A13 and performs photographing. For example, the camera 1 moves the imaging unit 11 in the pan direction and photographs the areas A11 to A13.

The three areas A11 to A13 are set in a manner that all seats where the student can sit are included. For example, the area A11 includes seat rows A21, A22. The area A12 includes a seat row A23. The area A13 includes seat rows A24, A25. As a result, the face of the student who takes the class in the classroom A1 can be photographed by the single camera 1.

The camera 1 sequentially photographs the areas A11 to A13. For example, the camera 1 moves the imaging unit 11 to photograph the area A11 and fixes the imaging unit 11 for 60 seconds. While the imaging unit 11 is fixed, the camera 1 detects a face of a student in the area A11, and transmits face data of the detected face to the information processing device 2.

The camera 1 transmits the face data of the student in the area A11 to the information processing device 2, then moves the imaging unit 11 to photograph the area A12, and fixes the imaging unit 11 for 60 seconds. While the imaging unit 11 is fixed, the camera 1 detects a face of a student in the area A12, and transmits face data of the detected face to the information processing device 2.

The camera 1 transmits the face data of the student in the area A12 to the information processing device 2, then moves the imaging unit 11 to photograph the area A13, and fixes the imaging unit 11 for 60 seconds. While the imaging unit 11 is fixed, the camera 1 detects a face of a student in the area A13, and transmits face data of the detected face to the information processing device 2.

A process in which the camera 1 photographs a loop of the area A11, the area A12, and the area A13 is referred to as one sequence. The camera 1 performs the one-sequence process a plurality of times during one class. For example, the camera 1 performs the one-sequence process three times during one class. In other words, the camera 1 detects the face of the student in the classroom A1 three times during one class.

Also, the number of areas is not limited to three. The number of areas may be four or more, or may be two or less. Moreover, the number of times of one-sequence processes during one class is not limited to three. The number of times of one-sequence processes during one class may be four or more, or may be two or less.

The camera 1 may divide the areas in the classroom A1 not only in the pan direction but also in a depth of a photographing direction to photograph the inside of the classroom A1. For example, the camera 1 may move the imaging unit 11 in the tilt direction and control zoom of the lens of the imaging unit 11 to photograph the inside of the classroom A1.

Figure 6:
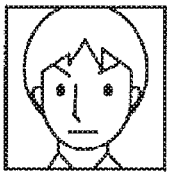
FIG. 6 shows an example of a table stored in a storage unit of the information processing device.
Figure 6:
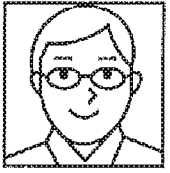
Figure 6:
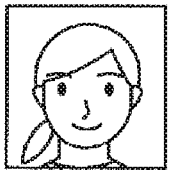

FIG. 6 shows an example of a table stored in the storage unit 23 of the information processing device 2. A table TB1 shown in FIG. 6 is stored in the storage unit 23, for example, at a beginning of a semester or when the class is organized.

The table TB1 may be created by the terminal device 3 or another terminal device which is different from the terminal device 3 and stored in the storage unit 23 of the information processing device 2. Information of the table TB1 may be added, changed, or deleted by the terminal device 3 or another terminal device, for example. The other terminal device is, for example, a terminal device operated by a person related to a school that provides the class.

As shown in FIG. 6, the table TB1 includes student information and class information. The student information includes the registered face data of the student who takes the class, and a name thereof. The class information includes day and time of the class taken by the student, and a classroom name of a classroom where the class is taught.

For example, in the example of FIG. 6, a name AAAA and registered face data of the name AAAA are registered in the table TB1. A student of the name AAAA takes a class in east A classroom from 9:00 to 10:30 on Monday.

Figure 7:
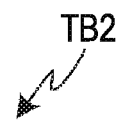
FIG. 7 shows an example of the table stored in the storage unit of the information processing device.

FIG. 7 shows another example of the table stored in the storage unit 23 of the information processing device 2. A table TB2 shown in FIG. 7 is stored, for example, when the camera is provided in the classroom.

The table TB2 may be created by another terminal device which is different from the terminal device 3 and stored in the storage unit 23 of the information processing device 2. Information of the table TB2 may be added, changed, or deleted by another terminal device different from the terminal device 3, for example. The other terminal device is, for example, a terminal device operated by an operator who maintains or manages the attendance state management system.

As shown in FIG. 7, the table TB2 includes camera identification information, installation information, and area setting information. The camera identification information is identification information for identifying the camera provided in the classroom. The camera identification information of the camera 1 provided in the classroom A1 is hereinafter referred to as "Camera 10".

The installation information is information indicating an installation location of the camera. The installation information may be, for example, a name of a classroom where the camera is provided. For example, in the example of FIG.

7, the camera 1 of the camera identification information "Camera 10" is provided in the east A classroom. The camera 1 is provided in the classroom A1 shown in FIG. 1. Therefore, the classroom name of the classroom A1 of FIG. 1 is the east A classroom.

The area setting information is information related to an area to be photographed by the camera, and includes PTZ information of the camera and interval time. The interval time is an interval time in which one sequence is performed.

For example, in the example of FIG. 7, the camera 1 of the camera identification information "Camera 10" sets three areas A, B, C (corresponding to the areas A11, A12, A13 of FIG. 5). PTZ information for the camera 1 to photograph the area A includes "x1", "y2", and "z3". Photographing of one sequence is performed at intervals of a time period x.

The information processing device 2 refers to the table TB2 and controls PTZ of the camera 1 through using the area setting information stored in the table TB2. For example, when the information processing device 2 causes the camera 1 to photograph the area A, the PTZ information of "x1", "y2", and "z3" is transmitted to the camera 1. The camera 1 photographs the area A based on the received PTZ information.

Figure 8:
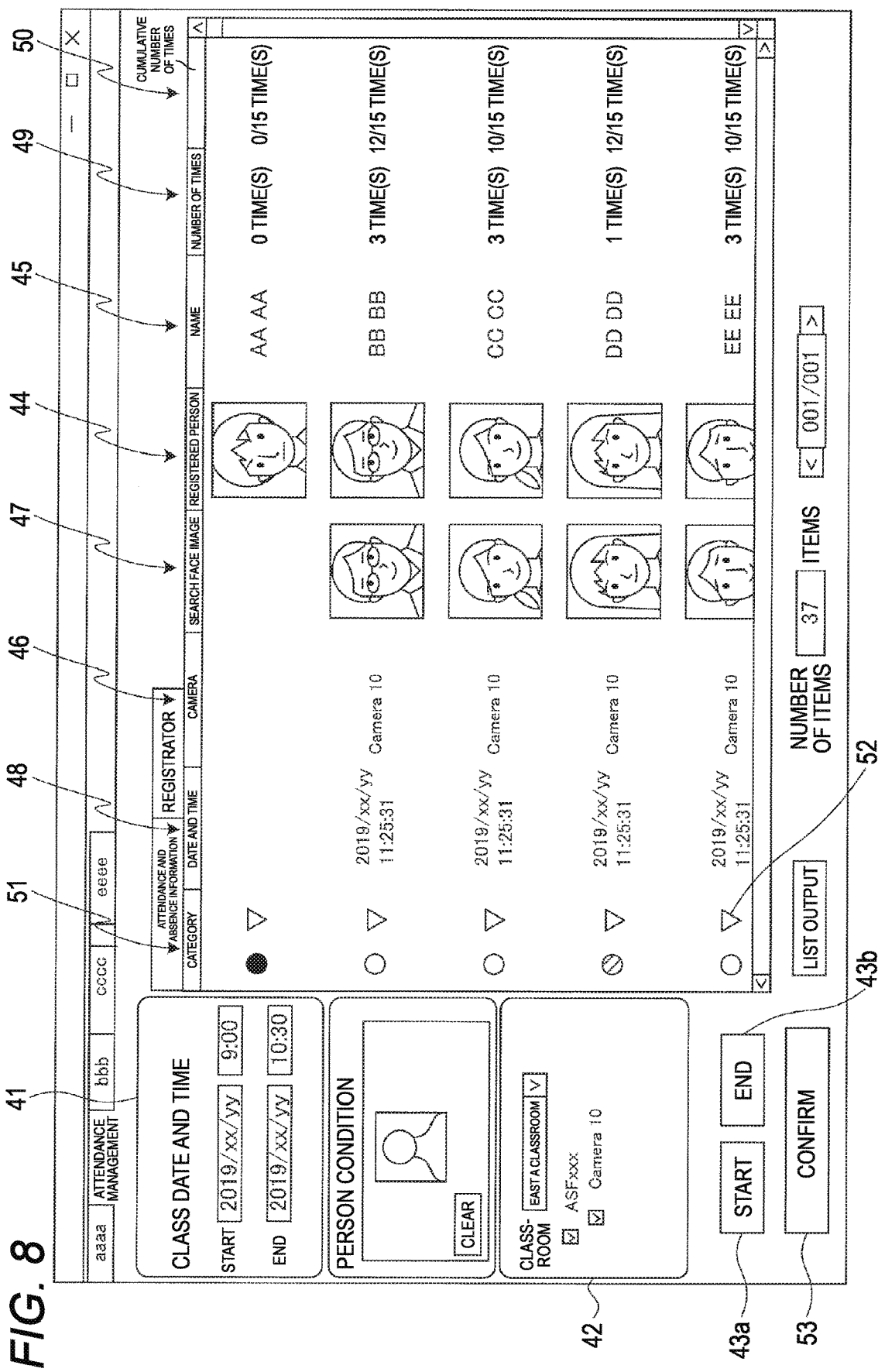
FIG. 8 shows an example of a screen displayed on a display device of the terminal device.

FIG. 8 shows an example of a screen displayed on the display device of the terminal device 3. As shown in FIG. 8, an image 41 for inputting date and time of the class is displayed on the display device of the terminal device 3. The teacher inputs start date and time and end date and time of the class before the class is started.

An image 42 for inputting a name of a classroom where the class is taught is displayed on the display device of the terminal device 3. The teacher inputs the classroom name of the classroom A1 where the class is taught before starting the class.

A button 43*a* for starting attendance state management of the class and a button 43*b* for ending the same are displayed on the display device of the terminal device 3. By pressing the button 43*a*, the teacher can start the attendance state management of the student by the attendance state management system. By pressing the button 43*b*, the teacher can end the attendance state management of the student by the attendance state management system.

When an attendance state management start operation is performed by pressing the button 43*a*, the terminal device 3 transmits start information which indicates a start of the attendance state management to the information processing device 2. The terminal device 3 transmits the start date and time and the end date and time of the class input in the image 41 to the information processing device 2 together with the start information. Moreover, the terminal device 3 transmits the classroom name input in the image 42 to the information processing device 2 together with the start information.

When the information processing device 2 receives the attendance state management start information transmitted from the terminal device 3, the information processing device 2 refers to the table TB1 shown in FIG. 6 based on the classroom name, the start date and time, and the end date and time received together with the start information. The information processing device 2 acquires, from the table TB1, the face data (registered face data) and the name of the student who takes the class related to the classroom name, the start date and time and the end date and time received from the terminal device 3.

When the information processing device 2 receives the attendance state management start information transmitted from the terminal device 3, the information processing device 2 refers to the table TB2 shown in FIG. 7 based on the classroom name received together with the start information. The information processing device 2 acquires, from the table TB2, the camera identification information and the area setting information of the camera provided in the classroom of the classroom name received from the terminal device 3.

The information processing device 2 transmits the registered face data and the name of the student acquired from the table TB1 and the camera identification information acquired from the table TB2 to the terminal device 3.

When the terminal device 3 receives the registered face data and the name of the student and the camera identification information transmitted from the information processing device 2, the terminal device 3 displays an image of the received registered face data and the name of the student on the display device, as shown in images 44, 45 of FIG. 8. Moreover, as shown in an image 46 of FIG. 8, the terminal device 3 displays the camera identification information of the camera provided in the classroom on the display device.

In this way, the face image and the name of the student who takes the class in the classroom are displayed on the display device of the terminal device 3. As a result, the teacher who teaches the class in the classroom can grasp the face and the name of the student who takes the class in the classroom.

Hereinafter, it is assumed that the information processing device 2 acquires the camera identification information "Camera 10" and the area setting information of the camera 1 provided in the classroom of the classroom name "east A classroom" from the table TB2 shown in FIG. 7.

As described above, the information processing device 2 transmits the registered face data and the name of the student and the camera identification information "Camera 10" acquired from the tables TB1, TB2 to the terminal device 3. Meanwhile, the information processing device 2 controls the camera 1 of the camera identification information "Camera 10" based on the camera identification information "Camera 10" and the area setting information corresponding to the camera identification information "Camera 10" acquired from the table TB2. That is, the information processing device 2 controls the camera 1 to photograph the areas A to C set in the area setting information of the table TB2.

The camera 1 photographs the face of the student in the classroom A1 in accordance with the control of the information processing device 2. For example, the camera 1 loops the area to be photographed between the areas A, B, C and photographs the face of the student at every interval time set in the area setting information. The camera 1 transmits the photographed face data of the student to the information processing device 2.

The information processing device 2 compares the face data transmitted from the camera 1 with the registered face data acquired with reference to the table TB1. In other words, the information processing device 2 compares the face data transmitted from the camera 1 with the registered face data transmitted to the terminal device 3.

When the face data transmitted from the camera 1 matches the registered face data, the information processing device 2 transmits matching information indicating the matching and the face data matching the registered face data to the terminal device 3. The information processing device 2 transmits, to the terminal device 3, a time when the student of the face data that matches the registered face data is photographed by the camera 1, and the number of times (the number of times of photographing) the face data matches the registered face data since the beginning of the class.

Upon receiving the face data transmitted from the information processing device 2, the terminal device 3 displays an image of the face data on the display device as shown in an image 47. Upon receiving the time transmitted from the information processing device 2, the terminal device 3 displays the time on the display device as shown in an image 48. Upon receiving the number of times transmitted from the information processing device 2, the terminal device 3 displays the number of times the registered face data matches the face data as shown in an image 49.

For example, the terminal device 3 may display the number of times indicated in the image 49 in an ascending or descending order in response to pressing of a "number of times" button shown in FIG. 8. The terminal device 3 sorts information displayed under buttons of "category", "date and time", "camera", "search face image", "registered person", "name", and "cumulative number of times" shown in FIG. 8 based on sorting of the number of times in the ascending or descending order. Similarly, the terminal device 3 may rearrange the information in response to pressing of another button.

As shown in an image 50, the terminal device 3 accumulates the number of times of attendance of a class, which is taught a plurality of times during a certain period of time, and displays the cumulative number of times. The cumulative number of times indicates, for example, the number of times of attendance so far of a student who attends a class which is taught a plurality of times (15 times in the case of the example of FIG. 8) during a single semester.

As shown in an image 51, the terminal device 3 displays information corresponding to the number of times in the image 49 on the display device. For example, the terminal device 3 displays a color corresponding to the number of times in the image 49 in the image 51. More specifically, the terminal device 3 displays a red circle for a student whose number of times in the image 49 is "0". The terminal device 3 displays a yellow circle for a student whose number of times in the image 49 is "1". The terminal device 3 displays a green circle for a student whose number of times in the image 49 is "2" or more.

As a result, the teacher can easily grasp the attendance state of the student by the image 51 of the display device of the terminal device 3. For example, the teacher can grasp that a student who is displayed with the red circle is likely to be absent. For example, the teacher can grasp that a student who is displayed with the yellow circle is likely to have escaped in the middle of the class. For example, the teacher can grasp that a student who is displayed with the green circle is likely to have attended the class from the beginning.

The terminal device 3 displays a button 52 corresponding to information in the image 51 (the image of the colored circles). When the button 52 is pressed, the terminal device 3 increments the number of times in the image 49 by 1. The terminal device 3 also changes the information in the image 51 by changing the number of times in the image 49.

For example, the teacher may press the button 52 when the teacher confirms that the student has temporarily left the classroom A1 and returned. Moreover, for example, the camera 1 may not be able to acquire the face data when the student faces downward. In this case, the teacher may press the button 52 corresponding to the student who has faced downward.

The terminal device 3 displays a button 53 for confirming class attendance of the student. The button 53 is pressed by the teacher, for example, after the class is ended. When the button 53 is pressed, the terminal device 3 transmits confirmation information to the information processing device 2.

Upon receiving the confirmation information from the terminal device 3, the information processing device 2 determines the attendance of the student. For example, the information processing device 2 determines that the students who are green and yellow in the image 51 have attended the class related to the classroom name, the start date and time, and the end date and time in the images 41, 42, and stores attendance information indicating that the student has attended the class in the storage unit 23. Moreover, the information processing device 2 determines that the student who is red in the image 51 is absent from the class related to the classroom name, the start date and time, and the end date and time, and stores absence information indicating that the student is absent from the class in the storage unit 23.

The information processing device 2 stores, in the storage unit 23, the cumulative number of times obtained by accumulating the number of times of attendance of the class which is taught a plurality of times during the certain period of time. The information processing device 2 increments the cumulative number of times of the students who are determined to have attended the class related to the classroom name, the start date and time, and the end date and time in the images 41, 42 by one. Upon receiving attendance state management start information transmitted from the terminal device 3, the information processing device 2 transmits the cumulative number of times to the terminal device 3. The terminal device 3 displays the image 50 based on the cumulative number of times transmitted from the information processing device 2.

Although the tables TB1, TB2 are stored in the storage unit 23 of the information processing device 2 in FIGS. 6 and 7, the present invention is not limited thereto. Both or one of the tables TB1, TB2 may be stored in a database separate from the information processing device 2. Hereinafter, it is assumed that the tables TB1, TB2 are stored in a registration DB (DB: database). The registration DB may also be regarded as a part of the information processing device 2, for example.

Figure 9:
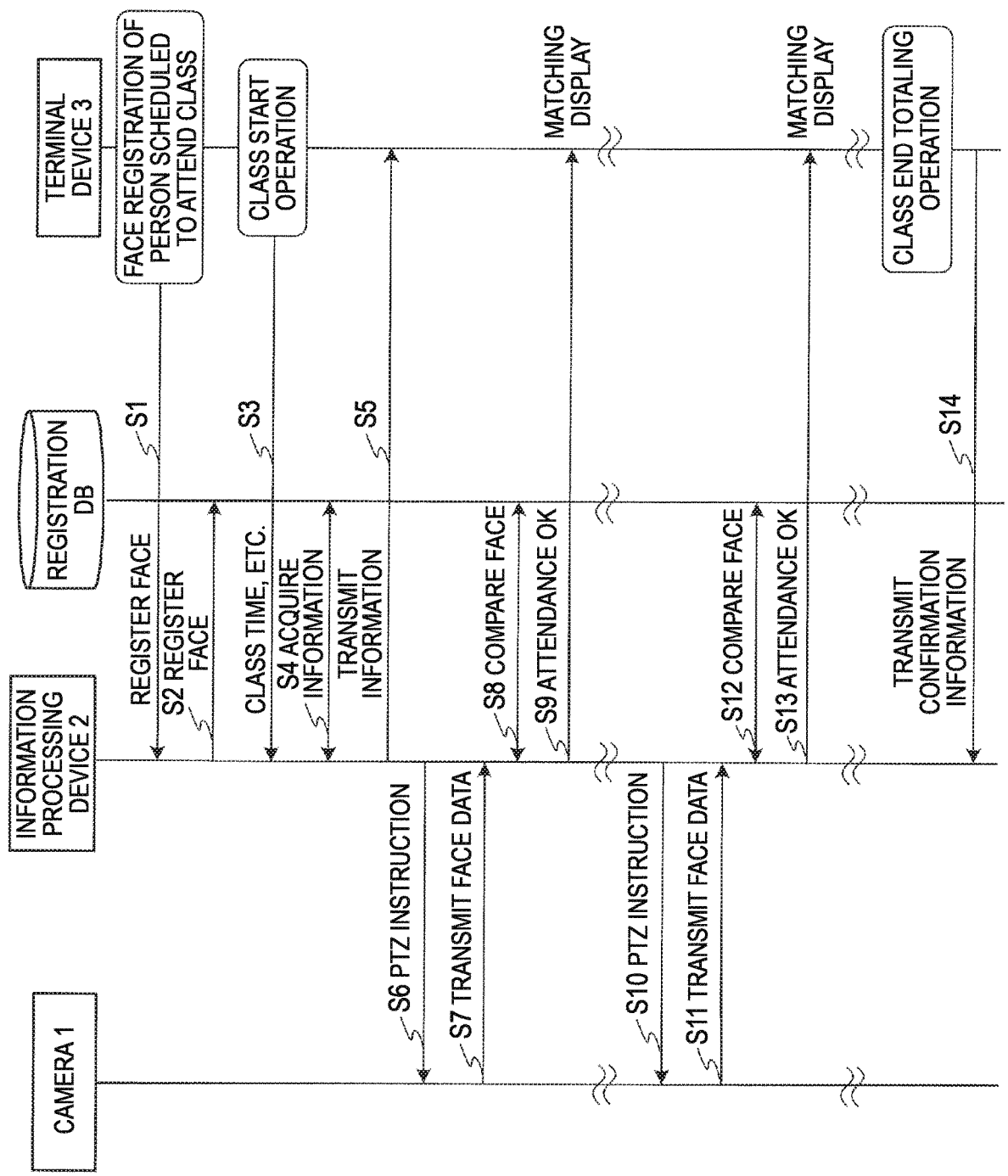
FIG. 9 is a sequence diagram showing an operation example of the attendance state management system.

FIG. 9 is a sequence diagram showing an operation example of the attendance state management system. Hereinafter, it is assumed that the table TB2 shown in FIG. 7 is already stored in the registration DB.

The control unit 31 of the terminal device 3 registers a face of a person who is scheduled to attend the class in the registration DB via the information processing device 2 according to an operation of the teacher or a person related to the school (steps S1, S2). For example, the control unit 31 of the terminal device 3 registers the student information and the class information described in FIG. 6 in the registration DB via the information processing device 2. It should be noted that the face registration may be registered once, for example, at the beginning of the semester.

The control unit 31 of the terminal device 3 receives a class start operation from the teacher. For example, the control unit 31 of the terminal device 3 receives the start date and time and the end date and time of the class in the image 41 shown in FIG. 8. Moreover, the control unit 31 of the terminal device 3 receives the classroom name of the classroom where the class is taught in the image 42 shown in FIG. 8. Then the control unit 31 of the terminal device 3 receives pressing of the button 43a shown in FIG. 8.

Upon receiving the pressing of the button 43a, the control unit 31 of the terminal device 3 transmits the attendance state management start information, the start date and time and the end date and time of the class input in the image 41, and the classroom name input in the image 42 to the information processing device 2 (step S3).

Upon receiving the start information transmitted in step S3, the control unit 21 of the information processing device 2 refers to the registration DB and the storage unit 23 to acquire various types of information (step S4).

For example, the control unit 21 of the information processing device 2 refers to the table TB1 of the registration DB, and acquires the student information (registered face data and name) corresponding to the start date and time, the end date and time, and the classroom name transmitted in step S3. Moreover, the control unit 21 of the information processing device 2 refers to the table TB2 of the registration DB, and acquires the camera identification information and the area setting information corresponding to the classroom name transmitted in step S3. Moreover, the control unit 21 of the information processing device 2 refers to the storage unit 23 and acquires the cumulative number of times of the student of the student information acquired from the table TB1.

Hereinafter, it is assumed that the control unit 21 of the information processing device 2 acquires the camera identification information "Camera 10" of the camera 1 provided in the classroom A1 from the table TB2.

The control unit 21 of the information processing device 2 transmits the various types of information acquired in step S4 to the terminal device 3 (step S5). For example, the control unit 21 of the information processing device 2 transmits the student information, the camera identification information, and the cumulative number of times acquired in step S4 to the terminal device 3. As a result, as shown in the image 44, the image 45, the image 46, and the image 50 in FIG. 8, the control unit 31 of the terminal device 3 displays the face image of the student who takes the class, the name thereof, the camera identification information, and the cumulative number of times on the display device.

The control unit 21 of the information processing device 2 transmits a PTZ instruction to the camera 1 of the camera identification information "Camera 10" acquired in step S4 (step S6). For example, the control unit 21 of the information processing device 2 transmits, to the camera 1, the PTZ information of each area included in the area setting information acquired in step S4.

The control unit 12 of the camera 1 photographs a certain area in the classroom A1 based on the PTZ information transmitted from the information processing device 2. The control unit 12 of the camera 1 cuts out a human face image from a photographed image, and transmits face data of the cut out face image to the information processing device 2 (step S7).

The control unit 21 of the information processing device 2 compares the face data received in step S7 with the registered face data acquired in step S4 (step S8). That is, the control unit 21 of the information processing device 2 compares the face data of the camera 1 provided in the classroom of the classroom name received in step S3 with the registered face data of a student who should attend the class taught in the classroom of the classroom name received in step S3.

When the face data received in step S7 matches the registered face data acquired in step S4, the control unit 21 of the information processing device 2 transmits the matching information (OK information) indicating the matching to the terminal device 3 (step S9). At this time, the control unit 21 of the information processing device 2 transmits the face data (the face data of the face image photographed by the camera 1) which matches the registered face data to the terminal device 3. Moreover, the control unit 21 of the information processing device 2 transmits the time when the face data matching the registered face data is photographed by the camera 1 to the terminal device 3. The control unit 21 of the information processing device 2 receives the attendance state management start information transmitted in step S3, and then transmits the number of times the face data matches the registered face data to the terminal device 3. As a result, as shown in the image 47, the image 48, the image 49, and the image 51 in FIG. 8, the control unit 31 of the terminal device 3 displays the face image photographed by the camera 1, the time when the face image is photographed, the number of times the face data matches the registered face data, and information corresponding to the number of times on the display device.

The control unit 21 of the information processing device 2 repeats the processes of steps S6 to S9 based on the time interval (see FIG. 7) included in the area setting information acquired in step S4. For example, when the time interval included in the area setting information acquired in step S4 has elapsed, the control unit 21 of the information processing device 2 executes processes of steps S10 to S13. The processes of steps S10 to S13 are the same as steps S6 to S9, and a description thereof will be omitted.

The control unit 31 of the terminal device 3 receives a totaling operation from the teacher who has finished the class. The control unit 31 of the terminal device 3 receives, for example, pressing of the button 53 of FIG. 8. Upon receiving the totaling operation, the control unit 31 of the terminal device 3 transmits the confirmation information to the information processing device 2 (step S14). The information processing device 2 determines attendance and absence information of the student in accordance with the determination information transmitted from the terminal device 3 and stores the confirmation information in the storage unit 23. The attendance and absence information includes, for example, the attendance information and the absence information of students in each class, as described in FIG. 8. The attendance and absence information includes the cumulative number of times.

As described above, the communication unit 22 of the information processing device 2 receives, a plurality of times during one class from the camera 1 provided in the classroom A1, the face image data of the student who takes the class in the classroom A1. The control unit 21 compares the face image data received from the camera 1 with the registered face image data of the student, and counts the number of times the student of the registered face image data is photographed by the camera during one class. The communication unit 22 transmits the number of times of photographing to the terminal device 3 used by the teacher who teaches the class. As a result, the teacher can grasp the attendance state of the student in the class by the terminal device 3. For example, the teacher can grasp that the student has escaped in the middle of the class.

(Modification 1)

The control unit 21 of the information processing device 2 may store the face data that does not match the registered face data in the storage unit 23 or the registration DB. A person whose face data does not match the registered face data can be regarded as a person who is not qualified to take the class.

The control unit 21 of the information processing device 2 may transmit the face data that does not match the registered face data to the terminal device 3 in response to a request from the terminal device 3. The terminal device 3 may display an image of the face data that does not match the registered face data on the display device.

Figure 10:
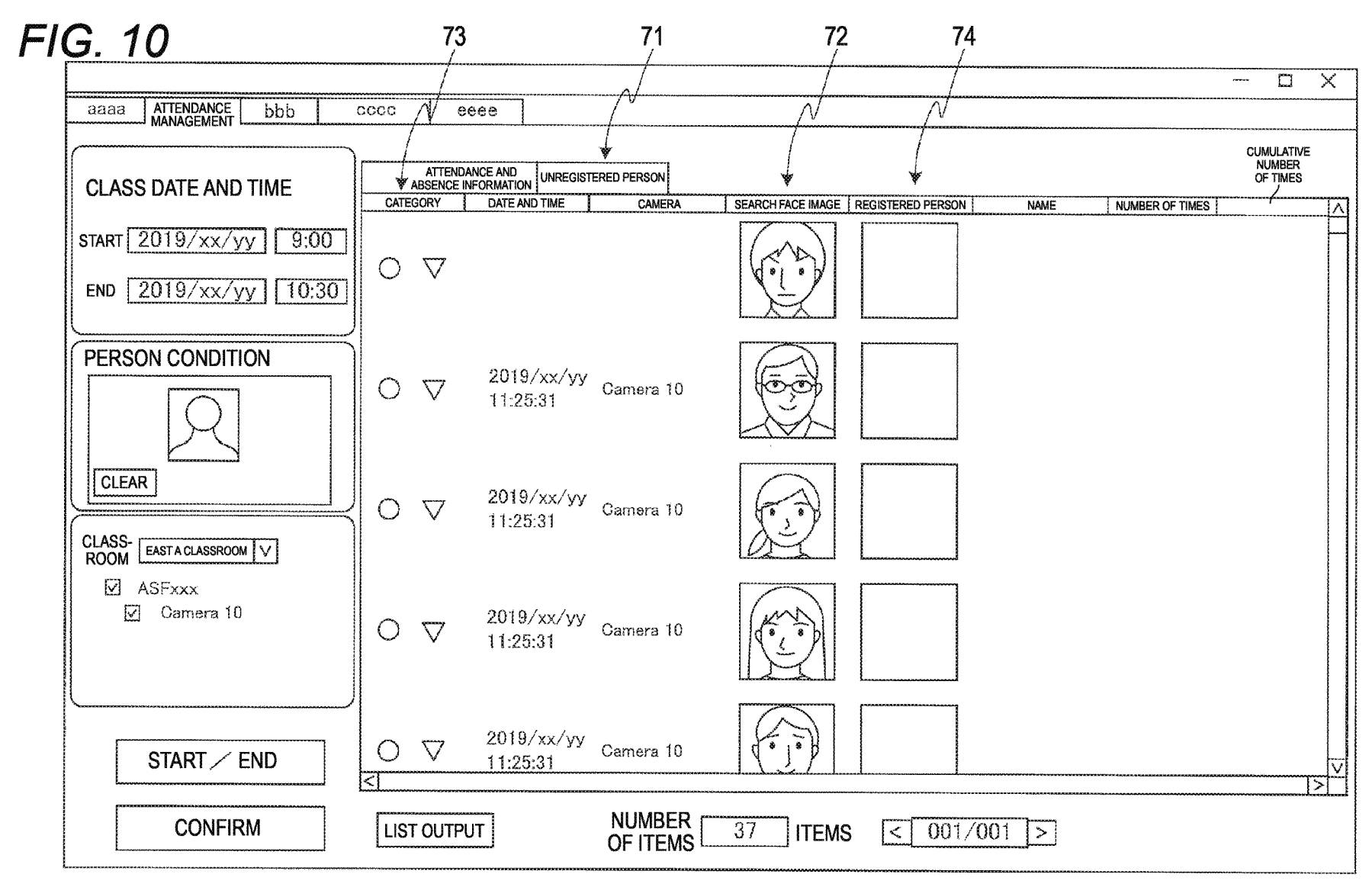

FIG. 10 shows an example of the screen displayed on the display device of the terminal device 3. When an "unregistered person" tab shown in an image 71 of FIG. 10 is pressed, the terminal device 3 requests the information processing device 2 to transmit the face data that does not match the registered face data (unregistered person request).

Upon receiving the unregistered person request from the terminal device 3, the information processing device 2 transmits the face data of the unregistered person stored in the storage unit 23 or the registration DB to the terminal device 3. Upon receiving the face data of the unregistered person from the information processing device 2, the terminal device 3 displays the face image of the unregistered person on the display device as shown in an image 72 of FIG. 10.

When the face image of the unregistered person is displayed on the display device, the terminal device 3 may display, on the display device, information indicating that the face image displayed on the display device is the unregistered person, as shown in an image 73. For example, the terminal device 3 may display a white circle on the display device.

As described above, the terminal device 3 displays the face image of the unregistered person on the display device. As a result, the teacher can grasp that a person who is not qualified to take the class is in the classroom.

When the face image of the unregistered person includes face image of a student who is qualified to take the class, the terminal device 3 can register the face data of the student who is qualified to take the class in the information processing device 2 in accordance with an operation of the teacher. For example, the teacher drags the face data displayed in the image 72 of FIG. 10 into a quadrangular frame shown in an image 74. The terminal device 3 transmits the face data dragged to the image 74 to the information processing device 2. The information processing device 2 stores the face data transmitted from the terminal device 3 in the table TB1.

As a result, the teacher can store, for example, the face data of a student, whose registration has been omitted, in the table TB1.

(Modification 2)

As described above, the information processing device 2 stores the number of times that the face data matches the registered face data in the storage unit 23. When the face data matches the registered face data, the information processing device 2 increments the number of times stored in the storage unit 23 by 1. At this time, the information processing device 2 may increment the number of times after giving a weight to the incremented "1".

For example, one or both of the number of times counted at the time of first matching and the number of times counted at the time of last matching may be weighted such that the weighting thereof is larger than that of the number of times counted at the time of other matching. The information processing device 2 may determine attendance of the student based on a cumulative value of the number of times during one class.

A student who is in the classroom at the beginning and the end of the class is likely to have taken the class from the beginning to the end. The information processing device 2 can more appropriately determine the class attendance of the student by weighting one or both of the number of times counted at the time of the first matching and the number of times counted at the time of the last matching such that the weighting thereof is larger than that of the number of times counted at the time of the other matching to determine the attendance of the student.

(Modification 3)

The information processing device 2 may collect positions of seats of the classroom A1 and grades of students sitting in the seats, and analyze correlation between the seats of the classroom A1 and the grades of the students. As a result, for example, the school can improve a grade of a student through using the correlation calculated by the information processing device 2.

The information processing device 2 may calculate a student attendance rate for each class. As a result, the school can grasp a degree of popularity of the teacher or the like.

(Modification 4)

Although the attendance state management system manages the attendance of the class in the above description, the present invention is not limited thereto. The attendance state management system can also be applied to seat management of, for example, a movie theater, a concert, a Shinkansen bullet train, or an airplane.

For example, the camera is provided to photograph a face of a person seated in a seat. The information processing device 2 stores the seat and information of a person who can sit in the seat (for example, registered face data) in association with each other. The information processing device 2 compares face data received from the camera with the registered face data to determine whether an appropriate person is seated in an appropriate seat. As a result, for example, seat ticket inspection is simplified.

The attendance state management system can also be applied to attendance management or seat management of a lecture or the like.

(Modification 5)

Although the information processing device 2 counts the number of times the student of the registered face data is photographed by the camera 1 during the class in the above description, the present invention is not limited thereto. The counting of the number of times of photographing of the camera 1 may also be performed by the terminal device 3.

For example, in steps S9, S13 of FIG. 9, the information processing device 2 transmits the matching information (attendance OK) to the terminal device 3. The terminal device 3 manages the number of times of photographing of the camera 1, receives the matching information from the information processing device 2, and counts (increment by 1) the number of times the student of the registered face data is photographed by the camera 1.

In a case where the terminal device 3 counts the number of times of photographing, the information processing device 2 may not transmit the number of times the student of the registered face data is photographed by the camera 1 to the terminal device 3 in steps S9, S13 of FIG. 9.

In the above embodiments, an expression " . . . unit" used for each component may be substituted by other expressions such as a " . . . circuit (circuitry)", a " . . . device", or a " . . . module".

Although the embodiment has been described above with reference to the drawings, the present disclosure is not limited to such examples. It will be apparent to those skilled in the art that various changes and modifications can be conceived within the scope of the claims. It should be understood that such changes and modifications also belong to the technical scope of the present disclosure. Moreover, constituent elements in the embodiments may be combined in any way within a range not departing from the gist of the present disclosure.

The present disclosure may be realized by software, hardware, or software linked with hardware. Each functional block used in the description of the above embodiments may be partially or entirely realized as an LSI which is an integrated circuit, and each process described in the above embodiments may be partially or entirely controlled by a single LSI or a combination of LSIs. The LSI may be provided with individual chips, or may be provided with one chip so as to include a part or all of the functional blocks. The LSI may include data input and output. The LSI may be referred to as an IC, a system LSI, a super LSI, or an ultra LSI depending on a degree of integration.

The method of circuit integration is not limited to the LSI, and may also be realized by a dedicated circuit, a general-purpose processor, or a dedicated processor. An FPGA which can be programmed after manufacturing of the LSI or a reconfigurable processor which can reconfigure the connection and settings of circuit cells inside the LSI may be used. The present disclosure may be realized as digital processing or analog processing.

Further, if an integrated circuit technology that replaces the LSI emerges due to a progress of a semiconductor technology or another derivative technology, the technology may naturally be used to integrate the functional blocks. Application of biotechnology or the like may also be possible.

INDUSTRIAL APPLICABILITY

The present disclosure is useful for class attendance state management using a camera.

What is claimed is:

1. An attendance management system comprising:
    a camera provided in a classroom including a plurality of areas; and
    an information processing device that is communicably connected with the camera,
    wherein the camera performs a sequence process, in which the camera sequentially photographs the plurality of areas, and detects a face of a student in each of the plurality of areas,
    the camera performs the sequence process a plurality of times during a class, and
    the information processing device includes a processor that performs operations including:
    receiving face image data of the student, who takes the class in the classroom, a plurality of times during the class from the camera provided in the classroom;
        comparing the face image data with registered face image data of the student and count the number of times the student of the registered face image data is photographed by the camera during the class; and
        transmitting the number of times of photographing to a terminal device used by a teacher who teaches the class,
    wherein the processor further transmits unmatched face image data to the terminal device, the unmatched face image data being the face image data which does not match the registered face image data, and
    after the processor transmits the unmatched face image data to the terminal device, when the processor receives a registration instruction from the terminal device, the processor registers the unmatched face image data as the registered face image data.

2. The attendance management system according to claim 1,
    wherein the processor further transmits a time when the student of the registered face image data is photographed by the camera to the terminal device.

3. The attendance management system according to claim 1,
    wherein the processor further transmits the face image data which matches the registered face image data to the terminal device.

4. The attendance management system according to claim 1,
    wherein the class is taught a plurality of times during a certain period of time, and
    the processor further counts the number of times of attendance of the class taught during the certain period of time for each student of the registered face image data.

5. The attendance management system according to claim 1,
    wherein the processor further determines attendance of the student in the class in response to an instruction from the terminal device.

6. An attendance state management method performed by a camera provided in a classroom including a plurality of areas, and an information processing device that is communicably connected with the camera, the method comprising:
    performing, by the camera, a sequence process, in which the camera sequentially photographs the plurality of areas in the classroom and detects a face of a student in each of the plurality of areas performing, by the camera, the sequence process a plurality of times during a class, wherein the sequence process includes,
    receiving, by the information processing device, face image data of the student, who takes the class in the classroom, a plurality of times during the class from the camera provided in the classroom;
    comparing, by the information processing device, the face image data with registered face image data of the student and counting the number of times the student of the registered face image data is photographed by the camera during the class;
    transmitting, by the information processing device, the number of times of photographing to a terminal device used by a teacher who teaches the class;
    transmitting, by the information processing device, unmatched face image data to the terminal device, the unmatched face image data being the face image data which does not match the registered face image data; and
    registering, by the information processing device, the unmatched face image data as the registered face image data, when a registration instruction is received from the terminal device after transmitting the unmatched face image data to the terminal device.

7. A non-transitory computer readable storage medium on which a program for making a computer to execute an attendance state management method is stored,
    the attendance state management method includes:
    causing a camera to perform a sequence process, in which the camera sequentially photographs a plurality of areas in a classroom, and detects a face of a student in each of the plurality of areas,
    causing the camera to perform the sequence process a plurality of times during a class,
    receiving face image data of the student, who takes the class in the classroom, a plurality of times during the class from the camera provided in the classroom;

comparing the face image data with registered face image data of the student and counting the number of times the student of the registered face image data is photographed by the camera during the class;

transmitting the number of times of photographing to a terminal device used by a teacher who teaches the class;

transmitting unmatched face image data to the terminal device, the unmatched face image data being the face image data which does not match the registered face image data; and registering the unmatched face image data as the registered face image data, when a registration instruction is received from the terminal device after transmitting the unmatched face image data to the terminal device.

8. The attendance management system according to claim 1, further comprising a memory that stores camera identification information identifying the camera and an interval time associated with each other, wherein the camera sequentially photographs the plurality of areas at the interval time stored in the memory in the sequence process.

9. The attendance management system according to claim 1, wherein the plurality of areas are set such that all seats where the student can sit are included.

10. The attendance management system according to claim 1, wherein the camera photographs one of the plurality of areas after photographing an other of the plurality of areas for a predetermined period of time.

11. The attendance management system according to claim 1, wherein the processor receives the face image data at least three times during the class from the camera, when counting the number of times of photographing the student, the processor gives a higher weight for at least one of first and last times of the at least three times than a weight for a time other than the first and last times of the at least three times.

\* \* \* \* \*